(12) United States Patent
Hines et al.

(10) Patent No.: US 8,059,789 B2
(45) Date of Patent: Nov. 15, 2011

(54) AUTOMATIC LOCATION IDENTIFICATION (ALI) EMERGENCY SERVICES PSEUDO KEY (ESPK)

(75) Inventors: John Gordon Hines, Kirkland, WA (US); Jonathan Croy, Seattle, WA (US); Roger Stuart Marshall, Auburn, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1199 days.

(21) Appl. No.: 11/607,036

(22) Filed: Dec. 1, 2006

(65) Prior Publication Data

US 2007/0201623 A1 Aug. 30, 2007

Related U.S. Application Data

(60) Provisional application No. 60/776,232, filed on Feb. 24, 2006.

(51) Int. Cl.
*H04M 11/00* (2006.01)
(52) U.S. Cl. ........................................................ 379/45
(58) Field of Classification Search .................... 379/45, 379/37; 455/404.1, 404.2
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor et al. |
| 4,494,119 A | 1/1985 | Wimbush |
| 4,625,081 A | 11/1986 | Lotio |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 4,972,484 A | 11/1990 | Theile et al. |
| 5,014,206 A | 5/1991 | Scribner et al. |
| 5,043,736 A | 8/1991 | Darnell et al. |
| 5,055,851 A | 10/1991 | Sheffer |

(Continued)

FOREIGN PATENT DOCUMENTS

WO WO9921380 4/1999

(Continued)

OTHER PUBLICATIONS

Qualcomm CDMA Technologies, LBS Control Plane/User Plane Overview—80-VD378-1NP B, 2006, pp. 1-36.

(Continued)

*Primary Examiner* — Stella Woo
(74) *Attorney, Agent, or Firm* — William H. Bollman (57) ABSTRACT

ESQK and/or ESRK (ESxK) number pool exhaustion and reuse errors are eliminated by replacing the ESxK identifier with an emergency services pseudo key (ESPK) identifier. A positioning center (MPC/VPC) replaces an ESxK received with a query with a ESPK in a return message. The ESPK is either a unique 10-digit number or unique alpha-numeric identifier that can be used to re-query the source of dynamic ALI data. The ESPK may be generated using, e.g., unique prefixing, suffixing, or randomizing. The ESPK is a non-constrained, unique identifier that preferably remains unique for the call instance over an extended period of time. The ESPK is used for any subsequent ALI request for the call. Each time a positioning center receives a query with ESPK, it is directly associated with, and returns, the updated location for the original emergency call, regardless of whether or not the original ESxK was reallocated to another emergency call.

27 Claims, 4 Drawing Sheets

U.S. PATENT DOCUMENTS

| | | |
|---|---|---|
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,126,722 A | 6/1992 | Kamis |
| 5,144,283 A | 9/1992 | Arens et al. |
| 5,161,180 A | 11/1992 | Chavous |
| 5,166,972 A | 11/1992 | Smith |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,239,570 A | 8/1993 | Koster et al. |
| 5,265,630 A | 11/1993 | Hartmann |
| 5,266,944 A | 11/1993 | Carroll et al. |
| 5,283,570 A | 2/1994 | DeLuca et al. |
| 5,289,527 A | 2/1994 | Tiedemann, Jr. |
| 5,293,642 A | 3/1994 | Lo |
| 5,299,132 A | 3/1994 | Wortham |
| 5,301,354 A | 4/1994 | Schwendeman et al. |
| 5,311,516 A | 5/1994 | Kuznicki et al. |
| 5,325,302 A | 6/1994 | Izidon et al. |
| 5,327,529 A | 7/1994 | Fults et al. |
| 5,334,974 A | 8/1994 | Simms et al. |
| 5,335,246 A | 8/1994 | Yokev et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,365,451 A | 11/1994 | Wang et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman et al. |
| 5,423,076 A | 6/1995 | Westergren et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,494,091 A | 2/1996 | Freeman et al. |
| 5,497,149 A | 3/1996 | Fast |
| 5,504,491 A | 4/1996 | Chapman |
| 5,506,886 A | 4/1996 | Maine et al. |
| 5,508,931 A | 4/1996 | Snider |
| 5,513,243 A | 4/1996 | Kage |
| 5,515,287 A | 5/1996 | Hakoyama et al. |
| 5,517,199 A | 5/1996 | DiMattei |
| 5,519,403 A | 5/1996 | Bickley et al. |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway et al. |
| 5,539,395 A | 7/1996 | Buss et al. |
| 5,539,398 A | 7/1996 | Hall et al. |
| 5,539,829 A | 7/1996 | Lokhoff et al. |
| 5,543,776 A | 8/1996 | L'Esperance et al. |
| 5,546,445 A | 8/1996 | Dennison et al. |
| 5,552,772 A | 9/1996 | Janky et al. |
| 5,555,286 A | 9/1996 | Tendler |
| 5,568,119 A | 10/1996 | Schipper et al. |
| 5,568,153 A | 10/1996 | Beliveau |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,594,780 A | 1/1997 | Wiedeman et al. |
| 5,604,486 A | 2/1997 | Lauro et al. |
| 5,606,313 A | 2/1997 | Allen et al. |
| 5,606,618 A | 2/1997 | Lokhoff et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague et al. |
| 5,661,755 A | 8/1997 | Van De Kerkhof et al. |
| 5,682,600 A | 10/1997 | Salin |
| 5,689,245 A | 11/1997 | Noreen et al. |
| 5,699,053 A | 12/1997 | Jonsson |
| 5,704,029 A | 12/1997 | Wright, Jr. |
| 5,721,781 A | 2/1998 | Deo et al. |
| 5,731,785 A | 3/1998 | Lemelson et al. |
| 5,740,534 A | 4/1998 | Ayerst et al. |
| 5,761,618 A | 6/1998 | Lynch et al. |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston et al. |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,809,415 A | 9/1998 | Rossmann |
| 5,812,086 A | 9/1998 | Bertiger et al. |
| 5,812,087 A | 9/1998 | Krasner |
| 5,822,700 A | 10/1998 | Hult et al. |
| 5,828,740 A | 10/1998 | Khuc et al. |
| 5,835,907 A | 11/1998 | Newman |
| 5,841,396 A | 11/1998 | Krasner |
| 5,857,201 A | 1/1999 | Wright, Jr. et al. |
| 5,864,667 A | 1/1999 | Barkan |
| 5,874,914 A | 2/1999 | Krasner |
| 5,896,369 A | 4/1999 | Warsta et al. |
| 5,920,821 A | 7/1999 | Seazholtz et al. |
| 5,922,074 A | 7/1999 | Richard et al. |
| 5,930,250 A | 7/1999 | Klok et al. |
| 5,930,701 A | 7/1999 | Skog |
| 5,943,399 A | 8/1999 | Bannister et al. |
| 5,945,944 A | 8/1999 | Krasner |
| 5,946,629 A | 8/1999 | Sawyer et al. |
| 5,946,630 A | 8/1999 | Willars et al. |
| 5,950,130 A | 9/1999 | Coursey |
| 5,950,137 A | 9/1999 | Kim |
| 5,953,398 A | 9/1999 | Hill |
| 5,960,362 A | 9/1999 | Grob et al. |
| 5,974,054 A | 10/1999 | Couts et al. |
| 5,978,685 A | 11/1999 | Laiho |
| 5,983,099 A | 11/1999 | Yao et al. |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithil et al. |
| 6,032,051 A | 2/2000 | Hall et al. |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |

| Patent No. | Date | Inventor |
|---|---|---|
| 6,064,875 A | 5/2000 | Morgan |
| 6,067,045 A | 5/2000 | Castelloe et al. |
| 6,070,067 A | 5/2000 | Nguyen et al. |
| 6,075,982 A | 6/2000 | Donovan et al. |
| 6,081,229 A | 6/2000 | Soliman et al. |
| 6,081,508 A | 6/2000 | West et al. |
| 6,085,320 A | 7/2000 | Kaliski, Jr. |
| 6,101,378 A | 8/2000 | Barabash et al. |
| 6,104,931 A | 8/2000 | Havinis et al. |
| 6,108,533 A | 8/2000 | Brohoff |
| 6,122,503 A | 9/2000 | Daly |
| 6,122,520 A | 9/2000 | Want et al. |
| 6,124,810 A | 9/2000 | Segal et al. |
| 6,131,067 A | 10/2000 | Girerd et al. |
| 6,133,874 A | 10/2000 | Krasner |
| 6,134,483 A | 10/2000 | Vayanos et al. |
| 6,138,003 A | 10/2000 | Kingdon et al. |
| 6,148,197 A | 11/2000 | Bridges et al. |
| 6,148,198 A | 11/2000 | Anderson et al. |
| 6,149,353 A | 11/2000 | Nilsson |
| 6,150,980 A | 11/2000 | Krasner |
| 6,154,172 A | 11/2000 | Piccionelli et al. |
| 6,169,891 B1 | 1/2001 | Gorham et al. |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider et al. |
| 6,178,506 B1 | 1/2001 | Quick, Jr. |
| 6,181,935 B1 | 1/2001 | Gossman et al. |
| 6,181,939 B1 | 1/2001 | Ahvenainen |
| 6,185,427 B1 | 2/2001 | Krasner et al. |
| 6,188,354 B1 | 2/2001 | Soliman et al. |
| 6,188,752 B1 | 2/2001 | Lesley |
| 6,188,909 B1 | 2/2001 | Alanara et al. |
| 6,189,098 B1 | 2/2001 | Kaliski, Jr. |
| 6,195,557 B1 | 2/2001 | Havinis et al. |
| 6,198,431 B1 | 3/2001 | Gibson |
| 6,199,045 B1 | 3/2001 | Giniger et al. |
| 6,199,113 B1 | 3/2001 | Alegre et al. |
| 6,205,330 B1 | 3/2001 | Winbladh |
| 6,208,290 B1 | 3/2001 | Krasner |
| 6,208,854 B1 | 3/2001 | Roberts et al. |
| 6,215,441 B1 | 4/2001 | Moeglein et al. |
| 6,219,557 B1 | 4/2001 | Havinis |
| 6,223,046 B1 | 4/2001 | Hamill-Keays et al. |
| 6,226,529 B1 | 5/2001 | Bruno et al. |
| 6,239,742 B1 | 5/2001 | Krasner |
| 6,247,135 B1 | 6/2001 | Feague |
| 6,249,680 B1 | 6/2001 | Wax et al. |
| 6,249,744 B1 | 6/2001 | Morita |
| 6,249,873 B1 | 6/2001 | Richard et al. |
| 6,253,074 B1 | 6/2001 | Carlsson |
| 6,253,203 B1 | 6/2001 | O'Flaherty et al. |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman et al. |
| 6,321,091 B1 | 11/2001 | Holland |
| 6,321,092 B1 | 11/2001 | Fitch |
| 6,321,257 B1 | 11/2001 | Kotola et al. |
| 6,324,542 B1 | 11/2001 | Wright, Jr. et al. |
| 6,327,473 B1 | 12/2001 | Soliman et al. |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross et al. |
| 6,360,102 B1 | 3/2002 | Havinis |
| 6,363,254 B1 | 3/2002 | Jones et al. |
| 6,367,019 B1 | 4/2002 | Ansell et al. |
| 6,370,389 B1 | 4/2002 | Isomursu et al. |
| 6,377,209 B1 | 4/2002 | Krasner |
| 6,377,810 B1 | 4/2002 | Geiger et al. |
| 6,400,314 B1 | 6/2002 | Krasner |
| 6,400,958 B1 | 6/2002 | Isomursu et al. |
| 6,411,254 B1 | 6/2002 | Moeglein et al. |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore et al. |
| 6,442,391 B1 | 8/2002 | Johansson et al. |
| 6,449,473 B1 | 9/2002 | Raivisto |
| 6,449,476 B1 | 9/2002 | Hutchison, IV et al. |
| 6,456,852 B2 | 9/2002 | Bar et al. |
| 6,463,272 B1 | 10/2002 | Wallace et al. |
| 6,477,150 B1 | 11/2002 | Maggenti et al. |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda et al. |
| 6,542,734 B1 | 4/2003 | Abrol et al. |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko et al. |
| 6,556,832 B1 | 4/2003 | Soliman |
| 6,560,461 B1 | 5/2003 | Fomukong et al. |
| 6,560,534 B2 | 5/2003 | Abraham et al. |
| 6,564,261 B1 | 5/2003 | Gudjonsson |
| 6,570,530 B2 | 5/2003 | Gaal et al. |
| 6,571,095 B1 | 5/2003 | Koodli |
| 6,574,558 B2 | 6/2003 | Kohli |
| 6,580,390 B1 | 6/2003 | Hay |
| 6,584,307 B1 | 6/2003 | Antonucci et al. |
| 6,584,552 B1 | 6/2003 | Kuno et al. |
| 6,587,691 B1 | 7/2003 | Granstam et al. |
| 6,594,500 B2 | 7/2003 | Bender et al. |
| 6,597,311 B2 | 7/2003 | Sheynblat et al. |
| 6,600,927 B2 | 7/2003 | Hamilton |
| 6,603,973 B1 | 8/2003 | Foladare et al. |
| 6,606,495 B1 | 8/2003 | Korpi et al. |
| 6,606,554 B2 | 8/2003 | Edge |
| 6,609,004 B1 | 8/2003 | Morse et al. |
| 6,611,757 B2 | 8/2003 | Brodie |
| 6,618,593 B1 | 9/2003 | Drutman et al. |
| 6,618,670 B1 | 9/2003 | Chansarkar |
| 6,621,452 B2 | 9/2003 | Knockeart et al. |
| 6,621,810 B1 | 9/2003 | Leung |
| 6,628,233 B2 | 9/2003 | Knockeart et al. |
| 6,633,255 B2 | 10/2003 | Krasner |
| 6,640,184 B1 | 10/2003 | Rabe |
| 6,650,288 B1 | 11/2003 | Pitt et al. |
| 6,650,901 B1 | 11/2003 | Schuster et al. |
| 6,661,372 B1 | 12/2003 | Girerd et al. |
| 6,665,539 B2 | 12/2003 | Sih et al. |
| 6,665,541 B1 | 12/2003 | Krasner et al. |
| 6,671,620 B1 | 12/2003 | Garin et al. |
| 6,677,894 B2 | 1/2004 | Sheynblat et al. |
| 6,678,357 B2 | 1/2004 | Stumer et al. |
| 6,680,694 B1 | 1/2004 | Knockeart et al. |
| 6,680,695 B2 | 1/2004 | Turetzky et al. |
| 6,687,504 B1 | 2/2004 | Raith |
| 6,691,019 B2 | 2/2004 | Seeley et al. |
| 6,694,258 B2 | 2/2004 | Johnson et al. |
| 6,697,629 B1 | 2/2004 | Grilli et al. |
| 6,698,195 B1 | 3/2004 | Hellinger |
| 6,701,144 B2 | 3/2004 | Kirbas et al. |
| 6,703,971 B2 | 3/2004 | Pande et al. |

| | | |
|---|---|---|
| 6,703,972 B2 | 3/2004 | van Diggelen |
| 6,704,651 B2 | 3/2004 | van Diggelen |
| 6,707,421 B1 | 3/2004 | Drury et al. |
| 6,714,793 B1 | 3/2004 | Carey et al. |
| 6,718,174 B2 | 4/2004 | Vayanos |
| 6,720,915 B2 | 4/2004 | Sheynblat |
| 6,721,578 B2 | 4/2004 | Minear et al. |
| 6,721,871 B2 | 4/2004 | Piispanen et al. |
| 6,724,342 B2 | 4/2004 | Bloebaum et al. |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | van Diggelen |
| 6,738,013 B2 | 5/2004 | Orler et al. |
| 6,738,800 B1 | 5/2004 | Aquilon et al. |
| 6,741,842 B2 | 5/2004 | Goldberg et al. |
| 6,744,856 B2 | 6/2004 | Karnik et al. |
| 6,744,858 B1 | 6/2004 | Ryan |
| 6,745,038 B2 | 6/2004 | Callaway, Jr. et al. |
| 6,747,596 B2 | 6/2004 | Orler et al. |
| 6,748,195 B1 | 6/2004 | Phillips |
| 6,751,464 B1 | 6/2004 | Burg et al. |
| 6,756,938 B2 | 6/2004 | Zhao et al. |
| 6,757,544 B2 | 6/2004 | Rangarajan et al. |
| 6,757,545 B2 | 6/2004 | Nowak et al. |
| 6,771,742 B2 | 8/2004 | McCalmont et al. |
| 6,771,971 B2 | 8/2004 | Smith |
| 6,772,340 B1 | 8/2004 | Peinado et al. |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado et al. |
| 6,775,802 B2 | 8/2004 | Gaal |
| 6,778,136 B2 | 8/2004 | Gronemeyer |
| 6,778,885 B2 | 8/2004 | Agashe et al. |
| 6,779,049 B2 | 8/2004 | Altman et al. |
| 6,781,963 B2 | 8/2004 | Crockett et al. |
| 6,788,249 B1 | 9/2004 | Farmer et al. |
| 6,795,444 B1 | 9/2004 | Vo |
| 6,795,699 B1 | 9/2004 | McCraw et al. |
| 6,799,049 B1 | 9/2004 | Zellner et al. |
| 6,799,050 B1 | 9/2004 | Krasner |
| 6,801,159 B2 | 10/2004 | Swope et al. |
| 6,804,524 B1 | 10/2004 | Vandermeijden |
| 6,807,534 B1 | 10/2004 | Erickson |
| 6,810,323 B1 | 10/2004 | Bullock et al. |
| 6,813,264 B2 | 11/2004 | Vassilovski |
| 6,813,560 B2 | 11/2004 | van Diggelen et al. |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,269 B2 | 11/2004 | Baucke et al. |
| 6,829,475 B1 | 12/2004 | Lee et al. |
| 6,832,373 B2 | 12/2004 | O'Neill |
| 6,839,020 B2 | 1/2005 | Geier et al. |
| 6,839,021 B2 | 1/2005 | Sheynblat et al. |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison et al. |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,733 B2 | 3/2005 | Sandhu et al. |
| 6,867,734 B2 | 3/2005 | Voor et al. |
| 6,873,854 B2 | 3/2005 | Crockett et al. |
| 6,876,734 B1 | 4/2005 | Summers |
| 6,882,850 B2 | 4/2005 | McConnell et al. |
| 6,885,874 B2 | 4/2005 | Grube et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes et al. |
| 6,912,545 B1 | 6/2005 | Lundy et al. |
| 6,915,208 B2 | 7/2005 | Garin et al. |
| 6,917,331 B2 | 7/2005 | Gronemeyer |
| 6,930,634 B2 | 8/2005 | Peng et al. |
| 6,937,187 B2 | 8/2005 | van Diggelen et al. |
| 6,937,597 B1 | 8/2005 | Rosenberg |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti et al. |
| 6,968,044 B2 | 11/2005 | Beason |
| 6,970,917 B1 | 11/2005 | Kushwaha et al. |
| 6,973,320 B2 | 12/2005 | Brown et al. |
| 6,975,266 B2 | 12/2005 | Abraham et al. |
| 6,978,453 B2 | 12/2005 | Rao et al. |
| 6,980,816 B2 | 12/2005 | Rohles et al. |
| 6,985,747 B2 | 1/2006 | Chithambaram |
| 6,993,355 B1 | 1/2006 | Pershan |
| 6,996,720 B1 | 2/2006 | DeMello et al. |
| 6,999,782 B2 | 2/2006 | Shaughnessy et al. |
| 7,020,480 B2 | 3/2006 | Coskun |
| 7,024,321 B1 | 4/2006 | Deninger et al. |
| 7,047,411 B1 | 5/2006 | DeMello et al. |
| 7,065,351 B2 | 6/2006 | Carter et al. |
| 7,065,507 B2 | 6/2006 | Mohammed et al. |
| 7,072,667 B2 | 7/2006 | Olrik |
| 7,079,857 B2 | 7/2006 | Maggenti et al. |
| 7,092,385 B2 | 8/2006 | Gallant |
| 7,103,018 B1 | 9/2006 | Hansen et al. |
| 7,103,574 B1 | 9/2006 | Peinado et al. |
| 7,106,717 B2 | 9/2006 | Rousseau et al. |
| 7,136,466 B1 | 11/2006 | Gao |
| 7,136,838 B1 | 11/2006 | Peinado et al. |
| 7,151,946 B2 | 12/2006 | Maggenti et al. |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,194,249 B2 | 3/2007 | Phillips |
| 7,200,380 B2 | 4/2007 | Havlark |
| 7,209,758 B1 | 4/2007 | Moll et al. |
| 7,209,969 B2 | 4/2007 | Lahti et al. |
| 7,218,940 B2 | 5/2007 | Niemenmaa et al. |
| 7,221,959 B2 | 5/2007 | Lindqvist et al. |
| 7,245,900 B1 | 7/2007 | Lamb |
| 7,260,186 B2 | 8/2007 | Zhu |
| 7,260,384 B2 | 8/2007 | Bales et al. |
| 7,321,773 B2 | 1/2008 | Hines |
| 7,330,899 B2 | 2/2008 | Wong |
| 7,333,480 B1 | 2/2008 | Clarke |
| 7,366,157 B1 | 4/2008 | Valentine |
| 7,369,508 B2 | 5/2008 | Parantainen |
| 7,369,530 B2 | 5/2008 | Keagy |
| 7,382,773 B2 | 6/2008 | Schoeneberger |
| 7,394,896 B2 | 7/2008 | Norton |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,495,608 B1 | 2/2009 | Chen |
| 7,519,353 B2 | 4/2009 | Stevens |
| 7,522,581 B2 | 4/2009 | Acharya |
| 7,573,982 B2 | 8/2009 | Breen |

| Patent/Pub No. | Date | Name |
|---|---|---|
| 7,602,886 B1 | 10/2009 | Beech |
| 7,617,287 B2 | 11/2009 | Vella |
| 7,623,447 B1 | 11/2009 | Faccin |
| 7,702,081 B1 | 4/2010 | Klesper |
| 7,711,094 B1 | 5/2010 | Olshansky |
| 7,747,258 B2 | 6/2010 | Farmer |
| 7,764,961 B2 | 7/2010 | Zhu et al. |
| 7,783,297 B2 | 8/2010 | Ishii |
| 7,881,233 B2 | 2/2011 | Bieselin |
| 7,895,263 B1 | 2/2011 | Kirchmeier |
| 7,937,067 B2 | 5/2011 | Maier |
| 2001/0011247 A1 | 8/2001 | O'Flaherty et al. |
| 2001/0021646 A1 | 9/2001 | Antonucci et al. |
| 2001/0040886 A1 | 11/2001 | Jimenez |
| 2002/0037735 A1 | 3/2002 | Maggenti et al. |
| 2002/0052214 A1 | 5/2002 | Maggenti et al. |
| 2002/0061760 A1 | 5/2002 | Maggenti et al. |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer et al. |
| 2002/0102996 A1 | 8/2002 | Jenkins |
| 2002/0102999 A1 | 8/2002 | Maggenti et al. |
| 2002/0111172 A1 | 8/2002 | DeWolf et al. |
| 2002/0112047 A1 | 8/2002 | Kushwaha et al. |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto et al. |
| 2002/0158777 A1 | 10/2002 | Flick |
| 2002/0173317 A1 | 11/2002 | Nykanen |
| 2002/0191595 A1 | 12/2002 | Mar |
| 2003/0007886 A1 | 1/2003 | Hwa et al. |
| 2003/0009277 A1 | 1/2003 | Fan |
| 2003/0009602 A1 | 1/2003 | Jacobs et al. |
| 2003/0012148 A1 | 1/2003 | Peters |
| 2003/0013449 A1 | 1/2003 | Hose et al. |
| 2003/0016804 A1 | 1/2003 | Sheha et al. |
| 2003/0026245 A1 | 2/2003 | Ejzak |
| 2003/0037163 A1 | 2/2003 | Kitada et al. |
| 2003/0040272 A1 | 2/2003 | Lelievre et al. |
| 2003/0065788 A1 | 4/2003 | Salomaki |
| 2003/0069002 A1 | 4/2003 | Hunter et al. |
| 2003/0072318 A1 | 4/2003 | Lam et al. |
| 2003/0078064 A1 | 4/2003 | Chan |
| 2003/0081557 A1 | 5/2003 | Mettala et al. |
| 2003/0086539 A1 | 5/2003 | McCalmont |
| 2003/0101329 A1 | 5/2003 | Lahti et al. |
| 2003/0101341 A1 | 5/2003 | Kettler et al. |
| 2003/0103484 A1 | 6/2003 | Oommen et al. |
| 2003/0108176 A1 | 6/2003 | Kung |
| 2003/0109245 A1 | 6/2003 | McCalmont |
| 2003/0114157 A1 | 6/2003 | Spitz et al. |
| 2003/0119521 A1 | 6/2003 | Tipnis et al. |
| 2003/0119528 A1 | 6/2003 | Pew et al. |
| 2003/0137961 A1 | 7/2003 | Tsirtsis et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0186709 A1 | 10/2003 | Rhodes |
| 2003/0196105 A1 | 10/2003 | Fineberg |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake et al. |
| 2004/0047461 A1 | 3/2004 | Weisman et al. |
| 2004/0068724 A1 | 4/2004 | Gardner, III et al. |
| 2004/0098497 A1 | 5/2004 | Banet et al. |
| 2004/0132465 A1 | 7/2004 | Mattila et al. |
| 2004/0150518 A1 | 8/2004 | Phillips et al. |
| 2004/0181689 A1 | 9/2004 | Kiyoto |
| 2004/0184584 A1 | 9/2004 | McCalmont |
| 2004/0185875 A1 | 9/2004 | Diacakis et al. |
| 2004/0190497 A1 | 9/2004 | Knox |
| 2004/0198332 A1 | 10/2004 | Lundsgaard |
| 2004/0198386 A1 | 10/2004 | Dupray |
| 2004/0203568 A1 | 10/2004 | Kirtland |
| 2004/0205151 A1 | 10/2004 | Sprigg et al. |
| 2004/0229632 A1 | 11/2004 | Flynn et al. |
| 2004/0242238 A1 | 12/2004 | Wang et al. |
| 2004/0247090 A1 | 12/2004 | Nurmela |
| 2004/0258021 A1 | 12/2004 | Kashimoto |
| 2004/0267445 A1 | 12/2004 | De Luca |
| 2005/0028034 A1 | 2/2005 | Gantman et al. |
| 2005/0030977 A1 | 2/2005 | Casey et al. |
| 2005/0031095 A1 | 2/2005 | Petrowicz |
| 2005/0039178 A1 | 2/2005 | Marolia et al. |
| 2005/0041578 A1 | 2/2005 | Huotari et al. |
| 2005/0043037 A1 | 2/2005 | Loppe |
| 2005/0053209 A1* | 3/2005 | D'Evelyn et al. ............. 379/111 |
| 2005/0083911 A1 | 4/2005 | Grabelsky |
| 2005/0086467 A1 | 4/2005 | Asokan et al. |
| 2005/0090236 A1 | 4/2005 | Schwinke et al. |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood et al. |
| 2005/0135569 A1* | 6/2005 | Dickinson et al. ............. 379/45 |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu et al. |
| 2005/0213716 A1 | 9/2005 | Zhu |
| 2005/0222908 A1 | 10/2005 | Altberg |
| 2005/0232252 A1 | 10/2005 | Hoover |
| 2005/0255857 A1 | 11/2005 | Kim |
| 2005/0259675 A1 | 11/2005 | Tuohino et al. |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1* | 12/2005 | Rollender .................. 455/404.1 |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0053225 A1 | 3/2006 | Poikselka et al. |
| 2006/0068753 A1 | 3/2006 | Karpen |
| 2006/0072729 A1 | 4/2006 | Lee et al. |
| 2006/0104306 A1 | 5/2006 | Adamczkk |
| 2006/0109960 A1 | 5/2006 | D'Evelyn |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja et al. |
| 2006/0212562 A1 | 9/2006 | Kushwaha et al. |
| 2006/0233338 A1 | 10/2006 | Venkata |
| 2006/0234639 A1 | 10/2006 | Kushwaha et al. |
| 2006/0234654 A1 | 10/2006 | Fok et al. |
| 2006/0239205 A1* | 10/2006 | Warren et al. ................. 370/254 |
| 2006/0258380 A1 | 11/2006 | Liebowitz |
| 2006/0259365 A1 | 11/2006 | Agarwal et al. |
| 2006/0293024 A1 | 12/2006 | Benco |
| 2006/0293066 A1 | 12/2006 | Edge |
| 2007/0003024 A1 | 1/2007 | Olivier |
| 2007/0014282 A1 | 1/2007 | Mitchell |
| 2007/0019614 A1 | 1/2007 | Hoffmann |
| 2007/0022011 A1 | 1/2007 | Altberg et al. |
| 2007/0026854 A1 | 2/2007 | Nath et al. |
| 2007/0026871 A1 | 2/2007 | Wager |
| 2007/0027997 A1 | 2/2007 | Polk |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |

| | | | |
|---|---|---|---|
| 2007/0115941 | A1 | 5/2007 | Patel |
| 2007/0117574 | A1 | 5/2007 | Watanabe |
| 2007/0117577 | A1 | 5/2007 | Harris |
| 2007/0121601 | A1 | 5/2007 | Kikinis |
| 2007/0149213 | A1 | 6/2007 | Lamba |
| 2007/0160036 | A1 | 7/2007 | Smith |
| 2007/0162228 | A1 | 7/2007 | Mitchell |
| 2007/0206568 | A1 | 9/2007 | Silver |
| 2007/0206613 | A1 | 9/2007 | Silver |
| 2007/0242660 | A1 | 10/2007 | Xu |
| 2007/0253429 | A1 | 11/2007 | James |
| 2007/0263610 | A1 | 11/2007 | Mitchell |
| 2007/0270164 | A1 | 11/2007 | Maier |
| 2008/0032703 | A1 | 2/2008 | Krumm |
| 2008/0037715 | A1 | 2/2008 | Prozeniuk |
| 2008/0045250 | A1 | 2/2008 | Hwang |
| 2008/0063153 | A1 | 3/2008 | Krivorot |
| 2008/0065775 | A1 | 3/2008 | Polk |
| 2008/0117859 | A1 | 5/2008 | Shahidi |
| 2008/0186164 | A1 | 8/2008 | Emigh |
| 2008/0214202 | A1 | 9/2008 | Toomey |
| 2009/0003535 | A1 | 1/2009 | Grabelsky |
| 2009/0221263 | A1 | 9/2009 | Titus |
| 2010/0076767 | A1 | 3/2010 | Vieri |
| 2011/0113060 | A1 | 5/2011 | Martini |

FOREIGN PATENT DOCUMENTS

| | | |
|---|---|---|
| WO | PCT/US9928848 | 6/1999 |
| WO | PCTUS0146666 | 2/2001 |
| WO | WO01/45342 | 6/2001 |
| WO | WO02/11407 | 2/2002 |
| WO | WO2004/025941 | 3/2004 |
| WO | WO2005/051033 | 6/2005 |
| WO | WO2007027166 | 3/2007 |

OTHER PUBLICATIONS

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Extended European Search Report from EPO in European Appl. No. 06827172.5 dated Dec. 29, 2009.

PCT International Search Report received in PCT/US2007/21133 dated Apr. 21, 2008.

47 code of federal regulations (Oct. 1, 2005 Edition).

International Search Report in PCT/US2008/01441dated May 16, 2008.

Yilin Ahao, Efficient and reliable date transmission for cellular and GPS based mayday systems, Nov. 1997, IEEE, IEEE Conference on Intelligent Transportation System, 1997. ITSC 97, 555-559.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Location Based Services V2 Roaming Support (non proprietary), 80-V8470-2NP A, dated Jan. 27, 2005, pp. 1-56.

Schulzrinne et al., Emergency Services for Internet Telephony Systems draft-schulzrinne-sipping-emergency-arch, IETF Standard Working Draft, Feb. 4, 2004, 1-22.

* cited by examiner

AUTOMATIC LOCATION IDENTIFICATION (ALI) EMERGENCY SERVICES PSEUDO KEY (ESPK)

This application claims priority from U.S. Provisional Application No. 60/776,232, entitled "Automatic Location Identification (ALI) Rebid ID", to Hines et al., filed Feb. 24, 2006, the entirety of which is expressly incorporated herein by reference.

BACKGROUND OF THE INVENTION

1. Field of the Invention

This invention relates to emergency call systems (e.g., E9-1-1), including wireless and Internet Protocol (IP) based Voice Over Internet Protocol (VoIP) emergency call systems, that rely on non-call associated signaling in order to provide location data.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

Figure 3:
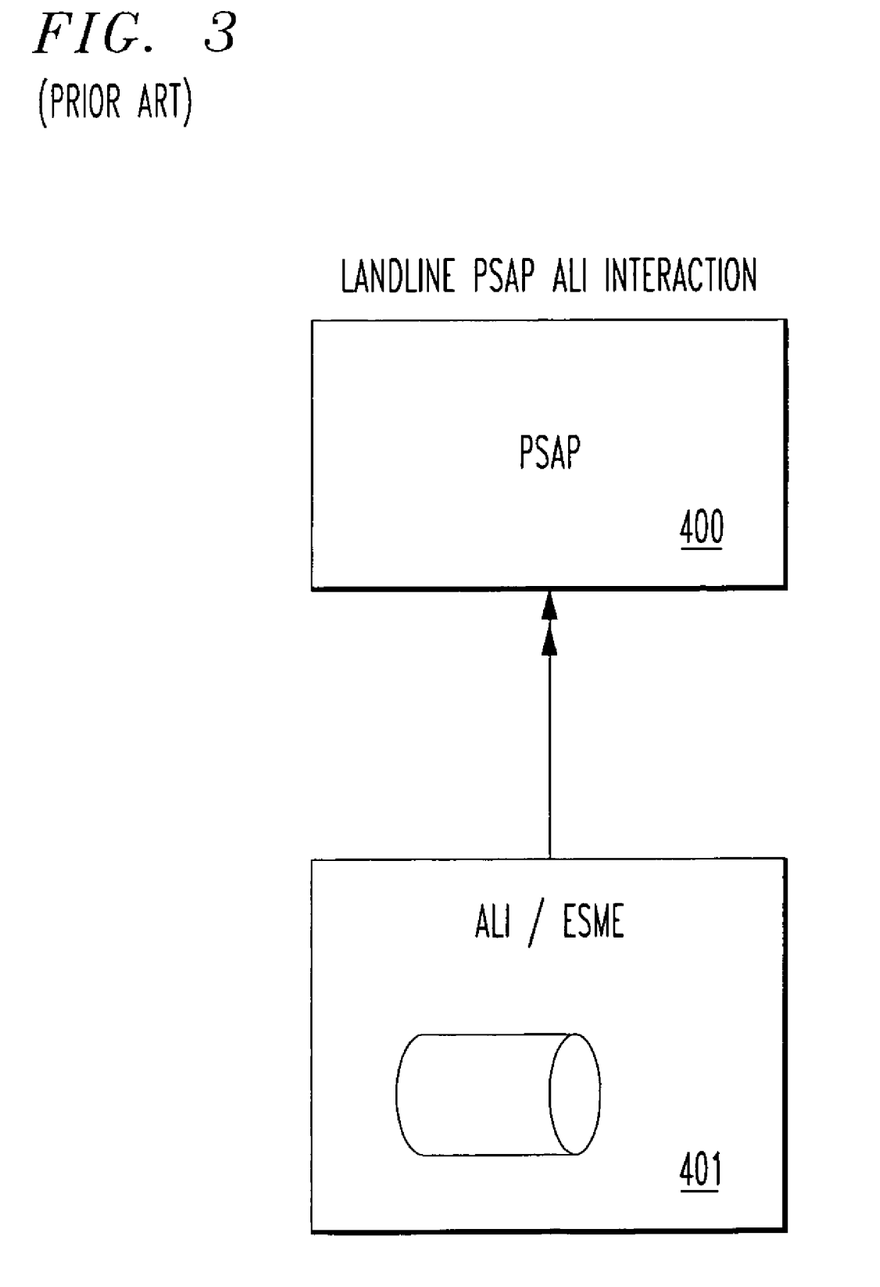
FIG. 3 shows a conventional landline public safety access point (PSAP) to automatic location identifier (ALI) connection.

FIG. 3 shows a conventional landline public safety access point (PSAP) to automatic location identifier (ALI) connection.

In particular, FIG. 3 shows a PSAP 400 connected to one Automatic Location Identifier (ALI) database 401. Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

An ALI is typically owned by a local exchange carrier (LEC) or a PSAP, and may be regional (i.e. connected to many PSAPs) or standalone (i.e. connected to only one PSAP). There is currently no one single standard interface protocol for PSAP-ALI connection/communication.

Figure 4:
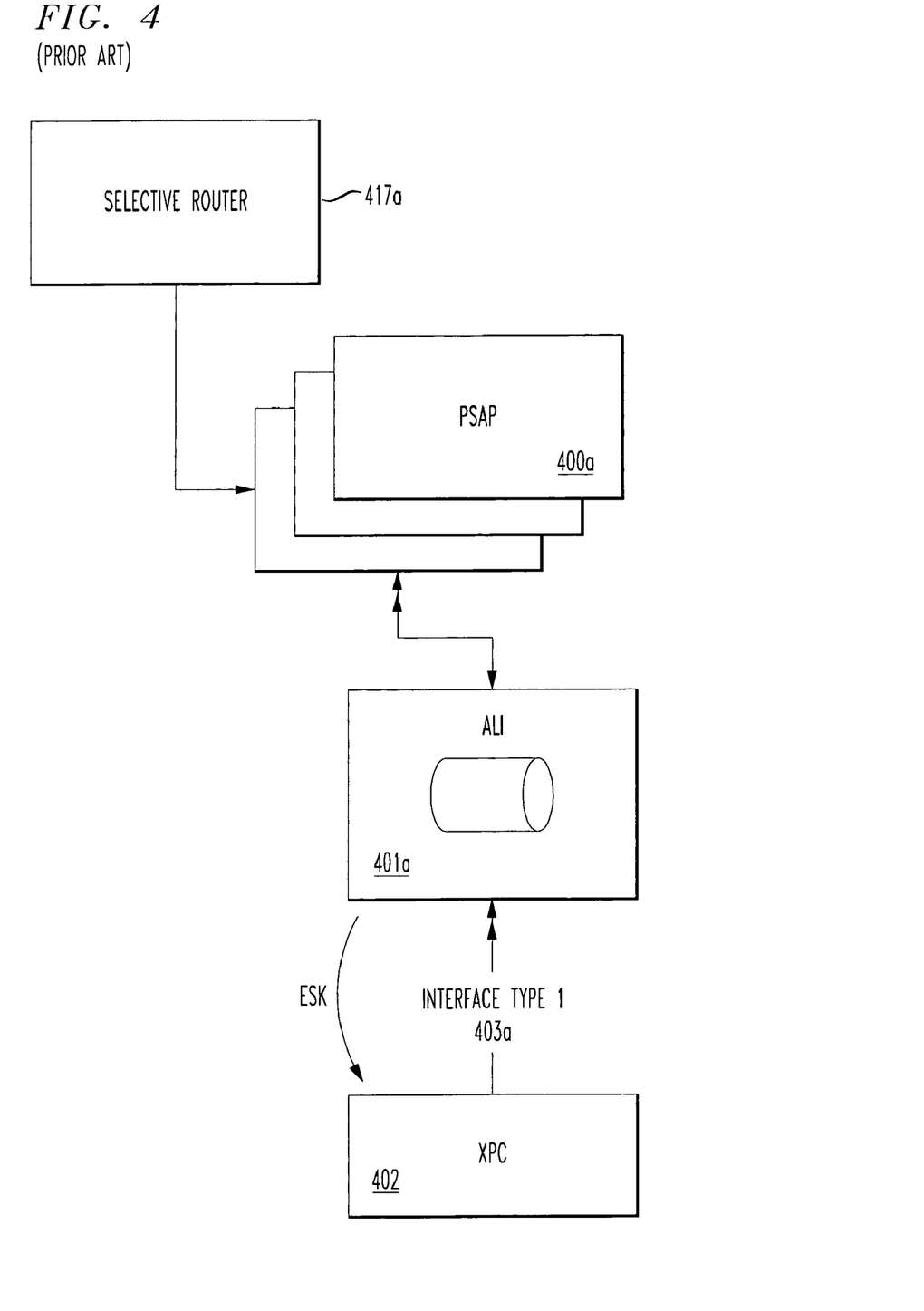
FIG. 4 shows a context diagram for a conventional non-landline positioning center (e.g., an Internet based voice over Internet Protocol (VoIP) positioning center).

FIG. 4 shows a context diagram for a conventional non-landline positioning center (e.g., an Internet based voice over Internet Protocol (VoIP) positioning center).

In particular, the ALI database 401 includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400 query the ALI 401 for location information. However, the ALI 401 is not pre-provisioned with location data for non-landline calls (e.g. cellular, VoIP etc) and must communicate with other network entities to obtain and deliver location data to the PSAP 400.

Non-landline telephony standards (e.g. cellular, VoIP etc) have mandated that ALIs 401 maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 4, an ALI may maintain connectivity to more than one positioning center via multiple interface types—both standard and non-standard (e.g. NENA-02, E2/E2+N-E2(ESP), PAM, etc.).

As used herein, the generic term "XPC" refers interchangeably to any standards-based positioning center. As examples, a positioning center 402 may be any one of the following types used in non-landline networks:

GMLC (Gateway Mobile Location Center): The positioning center that retrieves, forwards, stores and controls emergency position data within the GSM location network.

MPC (Mobile Position Center): The positioning center that retrieves, forwards, stores and controls emergency position data within the ANSI location network.

VPC (VoIP Positioning Center): The positioning center which retrieves, forwards, stores and controls emergency position data within the VoIP location network.

The term "XPC network" is used herein when appropriate to refer to any non-landline network where a positioning center 402 responds to ALI queries including an emergency services key for location, e.g., cellular, VoIP etc.

So, whether landline or non-landline, conventional emergency call centers, e.g., public safety access points (PSAPs) 400, use emergency services keys such as an emergency services query key (ESQK) or an emergency services routing key (ESRK), collectively referred to herein as ESxK, to query for location information. An emergency service key identifies an emergency call, and is associated with a particular selective router 417 associated with a given public safety access point (PSAP) 400. The emergency services keys ESQK and ESRK are conventionally used to query the automatic location identification (ALI) database 401 for the location of a given emergency caller. An emergency services key is delivered to the E9-1-1 selective router 417 and is the calling number/ANI for the call to the PSAP 400. The emergency services key is used by a selective router 417 as a key to selective routing data associated with the emergency call. The emergency services key is delivered by the selective router 417 to a PSAP 400 as the calling number/ANI for the emergency call, and is subsequently used by the PSAP 400 to request automatic location information (ALI) information indicating the location of the device making the emergency call. Conventional emergency service keys conform to ten-digit North American Numbering Plan Number definitions.

Existing, standardized solutions prescribe a finite pool of emergency services keys (ESQK and ESRK) which are allocated individually, one associated for each emergency call in progress. ESxK numbers are used to request updated location information from the ALI 401 while an emergency call is active, and as such, as appreciated by the inventors hereof, are subject to number exhaustion if the number of active emergency calls exceeds the number of ESxKs in the pool. But because ESxKs (ESQKs and ESRKs) are dynamically assigned at the time of call origination, and because the pool of ESxKs is limited, the inventors appreciate that it is possible for the pool of available ESxKs to run out.

For systems which implement ESQK and/or ESRK keys, It is a well known technique to use timers and default ESxKs to avoid problems associated with a limited pool of ESxKs. Timers have been specified and implemented to limit the amount of time that an ESxK can remain allocated to an emergency call, without regard for the actual call duration. For example, if a call continues after the timer has expired, the specific ESxK which was used to obtain updated location information can get reassigned to a new incoming emergency call.

However, timers are based solely on estimated call duration, a value which could be exceeded. Since emergency calls are numerous, and can remain active for long periods of time once initiated, some service providers have increased the number of allocated ESxK pools in an effort to minimize number pool exhaustion. Additionally, reliance on timers requires much larger pools of ESxKs to be allocated, which is an inefficient use of numbers, and may potentially lead to number exhaustion.

The present inventors appreciate that the conventional technique of using timers to expire the ESQK and ESRK allocation could prove to be devastating if a given emergency call using that expiring ESxK is still active. This is especially true if there is updated location information which would help provide emergency assistance to the caller.

Moreover, ESxK numbers must be purchased, so large numbers of ESxKs represent a direct cost to a provider. Also, as requirements for capacity increase, existing systems must often increase the size of the ESQK and ESRK number pool that they purchase, leading to additional costs for ESQK and ESRK number purchases, additional costs to implement, and additional costs to maintain these larger number pool sizes.

SUMMARY OF THE INVENTION

In accordance with the principles of the present invention, an emergency services pseudo key replacement module comprises a plurality of emergency services pseudo keys (ESPKs), and a positioning center maintaining said plurality of ESPKs. The positioning center receives an emergency services query key (ESQK) or emergency services routing key (ESRK), and replaces the ESQK or ESRK identifying a query message with one of the plurality of ESPKs to identify a response message in response to the query message.

A method of replacing a constrained emergency services key identifier received in a message with a non-constrained emergency services pseudo key identifier in accordance with another aspect of the invention comprises receiving a query message identified with a constrained emergency services key (ESxK). A non-constrained emergency services pseudo key (ESPK) is obtained, and a response to the query message is sent. The response to the query message is identified with a non-constrained emergency services pseudo key (ESPK) in replacement of the constrained ESxK received with the message.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

A conventional wireless and/or Internet Protocol (IP)-based (VoIP) E9-1-1 system uses a special number, e.g., an emergency services routing key (ESRK), an emergency services query key, (ESQK), or more generally any referenced key (ESxK), as an identifier to query network systems for additional emergency call related information, such as location information from an ALI (Automatic Location Identifier) database. The invention extends the capabilities of existing E9-1-1 Wireless and voice over Internet Protocol (VoIP) systems which use standard, ESQK and/or ESRK number pools by eliminating default call conditions resulting from ESQK or ESRK pool exhaustion.

Figure 1:
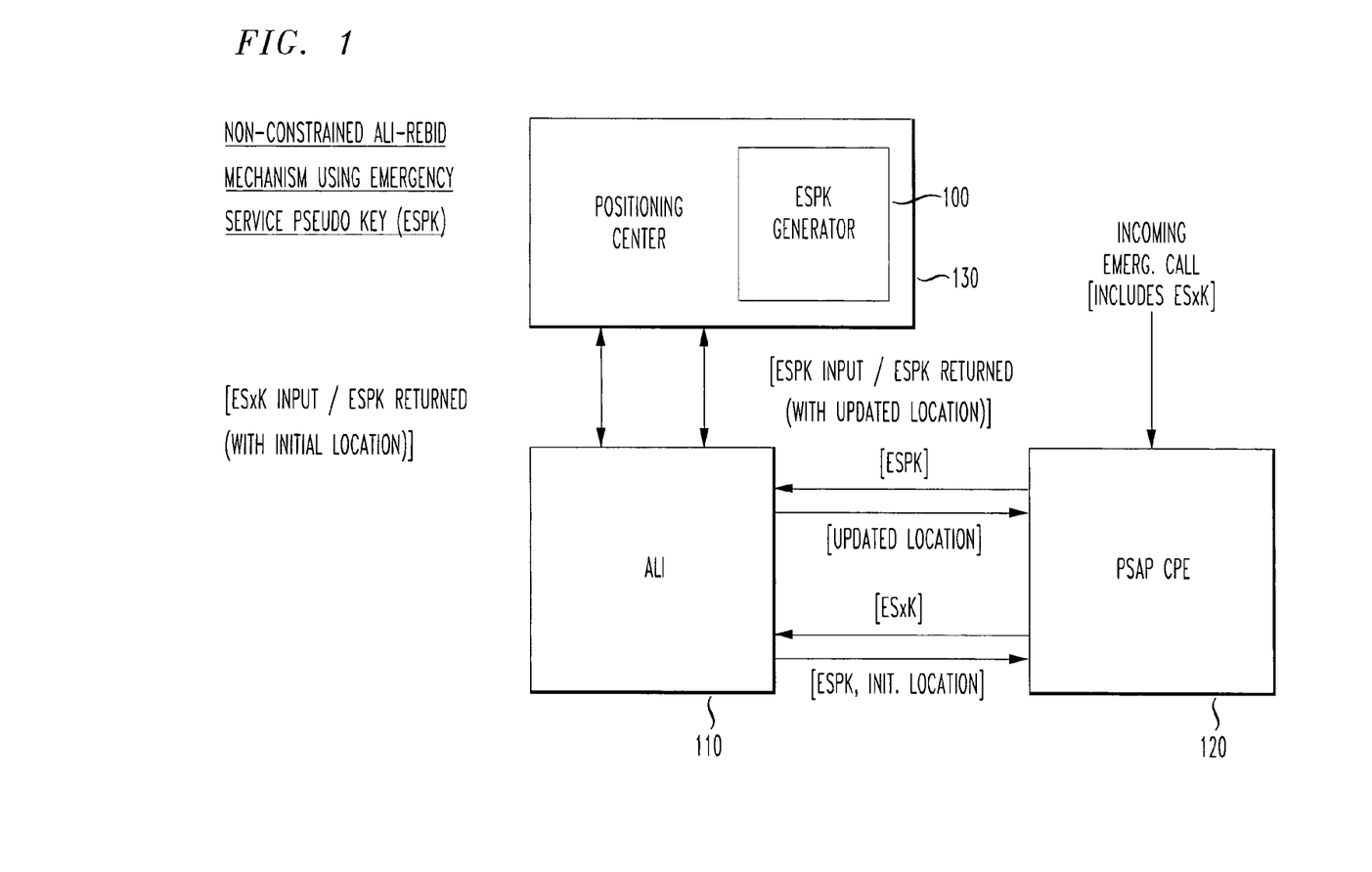
FIG. 1 shows the use of an ESPK generator and a Positioning Center (XPC) that replaces a received ESQK or ESRK with a generated ESPK, in accordance with the principles of the present invention.

FIG. 1 shows the use of an ESPK generator and a positioning center (XPC) that replaces a received ESQK or ESRK with a generated ESPK, in accordance with the principles of the present invention.

In particular, as shown in FIG. 1, an ALI 110 receives an ALI query (from the PSAP) containing an ESQK or ESRK, and forwards the ALI query to the positioning center (XPC) 130. An ESPK, provided by a positioning center (e.g., mobile positioning center (MPC) or VoIP positioning center (VPC)) with an ESPK generator 100, replaces the ESQK or ESRK with the ESPK and it is inserted into the query response and passed on to the appropriate PSAP 120 for subsequent use in requesting additional location updates without being constrained by expired timers or ESxK pool exhaustion.

In particular, the invention replaces an ESQK and/or ESRK identifier (generally referred to as an ESxK) contained in an ALI request with a non-constrained, uniquely numbered call-associated identifier referred to herein as an emergency services pseudo key identifier (ESPK). In response to an ALI query request, a replacement emergency services pseudo key (ESPK) identifier replaces the received ESxK identifier, and is returned within an ALI response message. This gives a non-constrained lifetime use as compared to what is typically a very short and somewhat predictable lifetime use with conventional (and purchased) ESxK numbers.

It is possible for conventional systems to experience exhaustion of the ESQK and/or ESRK number pool. Or for ESQK and/or ESRK timers to expire while an emergency call is still active. Or for location information to be not able to be received, or to not be able to request appropriately updated mid-call location for a mobile user, while an emergency call is still in progress due to ESxK number reuse. Or to be able to process a location information request for a "last-known" position after an emergency call has been terminated. These are all problematic scenarios for conventional systems that are greatly reduced or eliminated with the present invention.

In particular, the invention eliminates ESxK pool exhaustion. It also eliminates ESxK reuse errors that might otherwise exist in cases when a mobile positioning center (cellular network) or voice over Internet Protocol (VoIP) positioning center (VPC) (VoIP networks) is not notified by either the originating or receiving end that the call has ended.

A majority of costs related to the request, implementation, and maintenance of large, purchased ESxK number pools are eliminated because the number of conventional emergency services keys (ESQKs and/or ESRKs) needed within any pool are vastly reduced.

The non time dependent or number pool constrained, locally created automatic location identification (ALI) unique emergency services pseudo key (ESPK) may be a unique 10-digit number (equivalent to an ESxK), or may alternately be any form of alpha-numeric number (e.g., URI), that the ALI can use to re-query the source of the dynamic ALI data.

Each emergency services pseudo key (ESPK) identifier may be generated, e.g., through a process which incorporates a variety of numbering schemas, such as unique prefixing, suffixing, or randomizing. The emergency services pseudo key (ESPK) preferably remains unique for the call instance over an extended period of time (e.g., days, months, or longer, depending on configurable settings), instead of the otherwise conventional use of maintaining the same, original, ESxK for each set of exchanged messages for the entire duration of the call.

In operation, when the public safety access point (PSAP) customer premises equipment (CPE) receives an ESxK, and requests location information relating to an emergency caller from an ALI database 110, the associated mobile positioning center (MPC) (or VoIP positioning center (VPC) in an Internet based network), returns a new and call-instance unique ESPK, now associated with the caller's location for some specified extended length of time. For any subsequent ALI request for the call, this new, unique ESPK query identifier is used.

Each time the MPC/VPC receives a query using the emergency services pseudo key (ESPK), it is then directly associated with, and returns, the updated location (if available) for the original emergency call, regardless of whether or not the original ESQK or ESRK (ESxK) used was reallocated to another emergency call.

Figure 2:
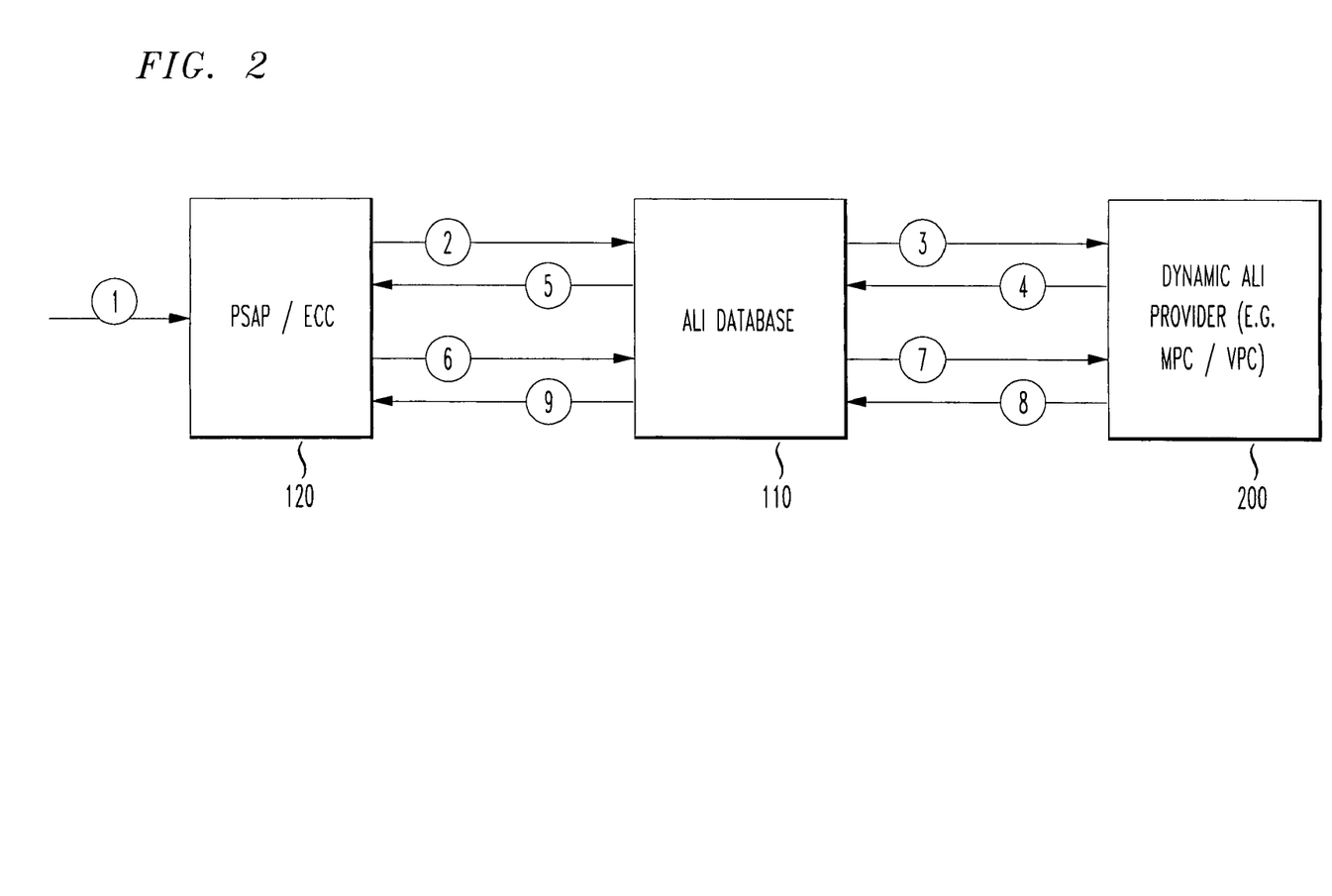
FIG. 2 shows message flow for accomplishing an ALI unique emergency services pseudo key (ESPK), in accordance with the principles of the present invention.

FIG. 2 shows message flow for accomplishing the exchange of a call-instance unique emergency services pseudo key (ESPK), in accordance with the principles of the present invention.

In particular, as shown in step 1 of FIG. 2, the public safety access point (PSAP)/emergency communication center (ECC) 120 receives the ESxK as a call back number from the signaling of inbound trunks (e.g., ISUP, CAMA).

In step 2, the PSAP/ECC 120 uses the ESxK to query the ALI database 110.

In step 3, the ALI database 110 recognizes the queried digits as a shell record, and steers the query to the appropriate positioning center (i.e., dynamic ALI) provider 200 such as a mobile positioning center (MPC) (cellular network) or VoIP positioning center (VPC) (VoIP network).

In step 4, the positioning center MPC/VPC 200 receives the ESxK, replaces the ESxK with an ESPK, and returns the ALI data and replacement emergency services pseudo key (ESPK) to the ALI database 110.

In step 5, the ALI database 110 provides the ALI data to the PSAP/ECC 120.

In step 6, the PSAP/ECC 120 requires an update to the ALI data (e.g., due to a call transfer) and re-queries the ALI database 110 using the emergency services pseudo key (ESPK) rather than the original ESxK.

In step 7, the ALI database 110 recognizes the queried digits as an emergency services pseudo key (ESPK) and steers the query to the positioning center (dynamic ALI) provider MPC/VPC 200.

In step 8, the MPC/VPC 200 receives the emergency services pseudo key (ESPK) and returns the ALI data to the ALI database 110.

In step 9, the ALI database 110 provides the ALI data to the PSAP/ECC 120.

Benefits of the invention include that ESQKs and/or ESRKs need be used only during steps #1, #2 and #3 shown in FIG. 2. This reduces the duration that ESxKs need be uniquely assigned to an emergency call. Therefore the size of the ESxK pool can be reduced (saving money), and/or can support additional system scaling without requiring any new ESxKs (cost avoidance).

Moreover, ESxK number allocation algorithms based on timers can be simplified. No re-use timer is required per ESxK since either: (1) the call will terminate (putting an ESxK back in the pool); or (2) an ALI 110 will query the positioning center (dynamic ALI) provider MPC/VPC 200 with the ESxK and get an emergency services pseudo key (ESPK) back. At that point the ESQK or ESRK (ESxK) can be safely put back in the pool.

Other benefits of the invention include that it enables non-time-constrained unique call-to-query identifier linking for improved public safety capability. It eliminates the need to have large ESxK number pools assigned to each PSAP emergency service number (ESN) and PSAP. It reduces the time and costs to deploy new PSAP ESNs and PSAPs. It gives PSAPs the ability to requery for location even after an ESxK reuse timer has expired. It provides PSAPs with ability to query/requery for "last-known" position information after call has been terminated.

The invention eliminates ESxK pool exhaustion, and default call error scenarios caused by ESxK pool exhaustion. It eliminates reporting of incorrect location information for on-going calls which have exceeded their ESxK timer values. It eliminates premature ESxK pool exhaustion due to call termination fault (i.e., call termination reports not received). It reduces the cost of acquiring large numbers of ESxKs. It reduces the cost of extending existing ESxKs due to increased capacity requirements, and it reduces the cost of maintaining large numbers of ESxK number pools.

The invention has particular relevance to ALI service providers and database users that rely on dynamic ALI updates, e.g., PSAPs, wireless carriers, VoIP service providers, etc. ALI service providers which have implemented the E2/E2+ N-E2 interface, including most of the ILEC service providers, as well as those ALI s/w vendors (Intrado, HBF, CML, etc.) which support the ALI software, may also benefit from implementation of an emergency services pseudo key (ESPK), in accordance with the principles of the present invention. With appropriate ESPK use in an ALI, the majority of the current number of approximately 6,000 public service access points (PSAPs) in North America, both for wireless E9-1-1 and voice over Internet Protocol (VoIP), can benefit from the significant advantages of this invention.

As PSAPs become Internet Protocol (IP)-enabled, then implementation of replacement ESPK identifiers for ESQKs or ESRKs becomes easier using alternate methods and/or other data exchange formats, such as the NENA XML ALI/CPE data exchange format.

While the invention has been described with reference to the exemplary embodiments thereof, those skilled in the art will be able to make various modifications to the described embodiments of the invention without departing from the true spirit and scope of the invention.

What is claimed is:

1. An emergency services pseudo key replacement module, comprising:
   an ESxK receiver to receive a time constrained emergency services key (ESxK);
   an ESxK replacement module to replace said time constrained ESxK with an emergency services pseudo key (ESPK) eliminating a time constraint associated with said time constrained ESxK; and
   a transmitter to transmit said non-time constrained ESPK to an automatic location identification (ALI) database.

2. The emergency services pseudo key replacement module according to claim 1, further comprising:
   an ESPK generator.

3. The emergency services pseudo key replacement module according to claim 2, wherein:
   said ESPK generator generates a plurality of ESPKs using unique prefixing.

4. The emergency services pseudo key replacement module according to claim 2, wherein:
   said ESPK generator generates a plurality of ESPKs using unique suffixing.

5. The emergency services pseudo key replacement module according to claim 2, wherein:
   said ESPK generator generates a plurality of ESPKs using randomizing.

6. The emergency services pseudo key replacement module according to claim 1, wherein:
   said ESPK is a 10-digit number.

7. The emergency services pseudo key replacement module according to claim 1, wherein:
   said ESPK is an alpha-numeric identifier.

8. The emergency services pseudo key replacement module according to claim 1, wherein:
   said ESPK is one of an emergency services query key (ESQK) and emergency services routing key (ESRK).

9. A method of replacing a constrained emergency services key identifier received in a message with a non-constrained emergency services pseudo key identifier, comprising:
   receiving a query message identified with a time constrained emergency services key (ESxK);
   replacing said time constrained ESxK with an emergency services pseudo key (ESPK) eliminating a time constraint associated with said time constrained ESxK; and
   transmitting said non-time constrained ESPK to an automatic location identification (ALI) database.

10. The method of replacing a constrained emergency services key identifier received in a message with a non-constrained emergency services pseudo key identifier according to claim 9, wherein:
    said received message is received by a positioning center identified with one of an emergency services query key (ESQK) and an emergency services routing key (ESRK).

11. The method of replacing a constrained emergency services key identifier received in a message with a non-constrained emergency services pseudo key identifier according to claim 10, wherein:
    said received message is received over an Internet.

12. The method of replacing a constrained emergency services key identifier received in a message with a non-constrained emergency services pseudo key identifier according to claim 10, wherein:
    said positioning center is a mobile positioning center in a cellular network.

13. The method of replacing a constrained emergency services key identifier received in a message with a non-constrained emergency services pseudo key identifier according to claim 10, wherein:
    said positioning center is a voice over Internet Protocol (VoIP) positioning center (VPC).

14. The method of replacing a constrained emergency services key identifier received in a message with a non-constrained emergency services pseudo key identifier according to claim 9, further comprising:
    sending a message with said emergency services pseudo key identifier to a public safety access point (PSAP).

15. The method of replacing a constrained emergency services key identifier received in a message with a non-constrained emergency services pseudo key identifier according to claim 9, wherein:
    said message is sent using an Internet Protocol message.

16. The method of replacing a constrained emergency services key identifier received in a message with a non-constrained emergency services pseudo key identifier according to claim 9, wherein:
    said ESxK expires before use of said ESPK is completed.

17. The method of replacing a constrained emergency services key identifier received in a message with a non-constrained emergency services pseudo key identifier according to claim 9, further comprising:
    generating a plurality of ESPKs each being a 10-digit identifier.

18. Apparatus for replacing a constrained emergency services key identifier received in a message with a non-constrained emergency services pseudo key identifier, comprising:
    means for receiving a query message identified with a time constrained emergency services key (ESxK);
    means for replacing said time constrained ESxK with an emergency services pseudo key (ESPK) eliminating a time constraint associated with said time constrained ESxK; and
    means for transmitting said non-time constrained ESPK to an automatic location identification (ALI) database.

19. The apparatus for replacing a constrained emergency services key identifier received in a message with a non-constrained emergency services pseudo key identifier according to claim 18, wherein:
    said received message is received by a positioning center identified with one of an emergency services query key (ESQK) and an emergency services routing key (ESRK).

20. The apparatus for replacing a constrained emergency services key identifier received in a message with a non-constrained emergency services pseudo key identifier according to claim 19, wherein:
    said received message is received over an Internet.

21. The apparatus for replacing a constrained emergency services key identifier received in a message with a non-constrained emergency services pseudo key identifier according to claim 19, wherein:
    said positioning center is a mobile positioning center in a cellular network.

22. The apparatus for replacing a constrained emergency services key identifier received in a message with a non-constrained emergency services pseudo key identifier according to claim 19, wherein:
    said positioning center is a voice over Internet Protocol (VoIP) positioning center (VPC).

23. The apparatus for replacing a constrained emergency services key identifier received in a message with a non-constrained emergency services pseudo key identifier according to claim 18, further comprising:
 means for sending a message with said emergency services pseudo key identifier to a public safety access point (PSAP).

24. The apparatus for replacing a constrained emergency services key identifier received in a message with a non-constrained emergency services pseudo key identifier according to claim 18, wherein:
 said message is sent using an Internet Protocol message.

25. The apparatus for replacing a constrained emergency services key identifier received in a message with a non-constrained emergency services pseudo key identifier according to claim 18, wherein:
 said ESxK expires before use of said ESPK is completed.

26. The method of replacing a constrained emergency services key identifier received in a message with a non-constrained emergency services pseudo key identifier according to claim 18, further comprising:
 means for generating a plurality of ESPKs each being a 10-digit identifier.

27. The method of replacing a constrained emergency services key identifier received in a message with a non-constrained emergency services pseudo key identifier according to claim 26, wherein:
 said plurality of ESPKs are each an alpha-numeric identifier.

* * * * *

UNITED STATES PATENT AND TRADEMARK OFFICE
CERTIFICATE OF CORRECTION

| | | |
|---|---|---|
| PATENT NO. | : 8,059,789 B2 | Page 1 of 1 |
| APPLICATION NO. | : 11/607036 | |
| DATED | : November 15, 2011 | |
| INVENTOR(S) | : Hines | |

It is certified that error appears in the above-identified patent and that said Letters Patent is hereby corrected as shown below:

Title Page
    Item (75), "Inventors" replace:
        "John Gordon Hines" with
        --Gordon John Hines--

Signed and Sealed this
Thirty-first Day of July, 2012

David J. Kappos
*Director of the United States Patent and Trademark Office*